Aug. 26, 1952     E. H. HOLZWORTH     2,608,289
SHAKER CONVEYER
Filed Jan. 7, 1948     2 SHEETS—SHEET 1
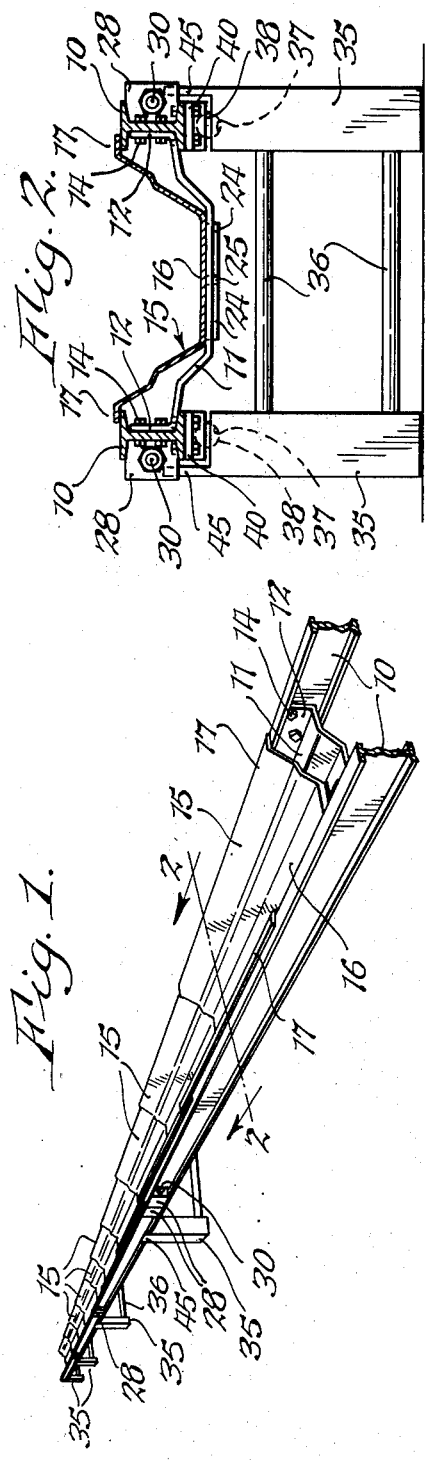
INVENTOR.
Ernst H. Holzworth,
BY
John E. Pochow,
Attorney.

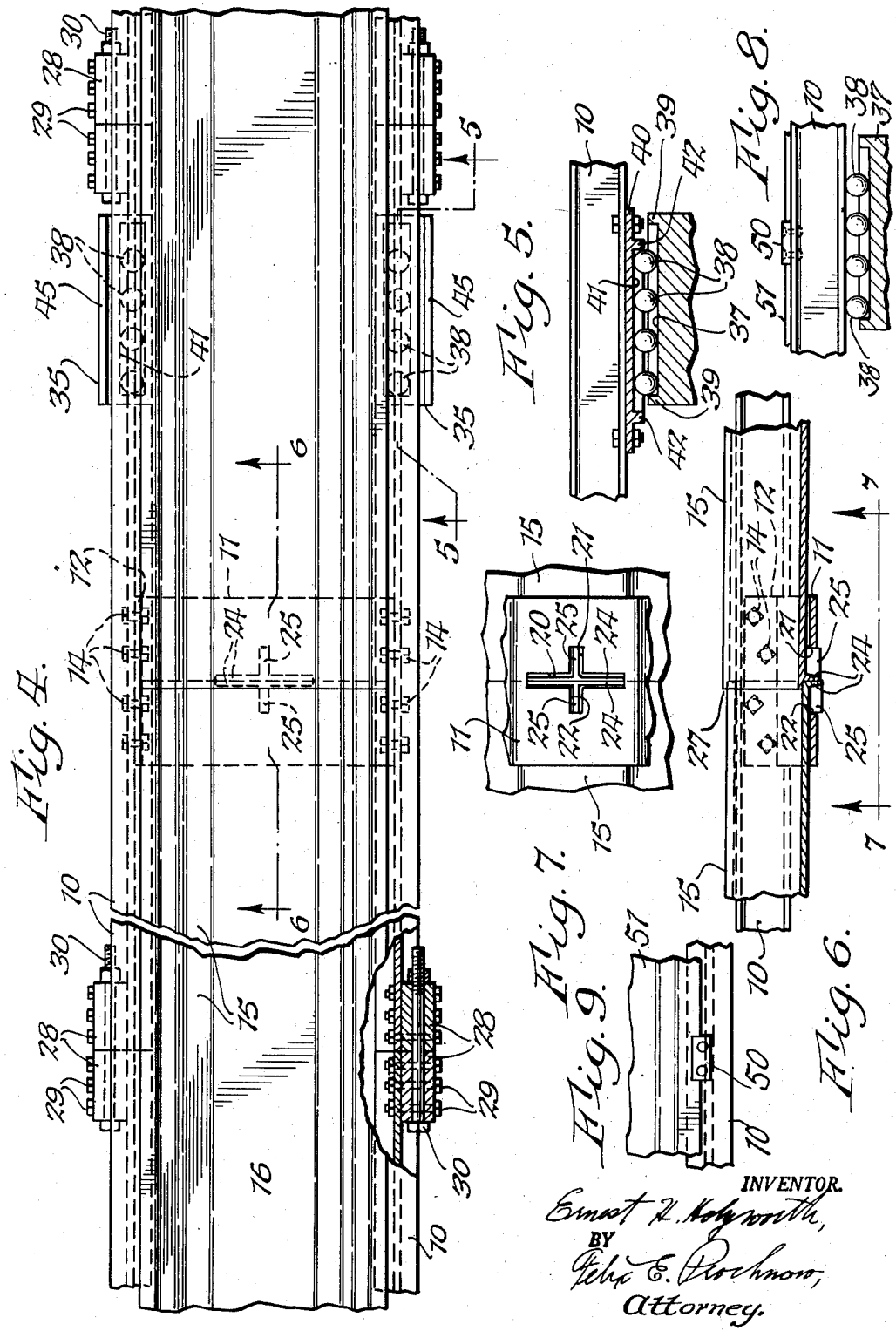

Patented Aug. 26, 1952

2,608,289

UNITED STATES PATENT OFFICE 2,608,289

SHAKER CONVEYER

Ernest H. Holzworth, Buffalo, N. Y.

Application January 7, 1948, Serial No. 1,006

9 Claims. (Cl. 198—220)

This invention relates to improvements in conveyors and more particularly to conveyors of the shaker type in which the material is moved along the conveyor because of the reciprocatory motion of the conveyor.

One of the objects of this invention is to provide an improved conveyor which is so constructed that it may be made mainly of light weight metals or alloys, so that a saving in power to operate the conveyor is effected, and so that the conveyor may be easily moved from place to place. Another object of this invention is to provide a conveyor of this type which is so constructed that the length of the same may readily be changed by adding or removing parts of the conveyor. Another object of this invention is to provide a conveyor with trough sections which are so formed that they can be readily removed from the conveyor and replaced thereon by merely interfitting parts of the trough sections with corresponding parts of the conveyor without requiring the use of bolts or other fastening devices which must be released before the trough sections can be removed from the conveyor.

It is also an object of this invention to provide a conveyor with bearings of improved construction for permitting reciprocation of the conveyor. Another object is to provide a conveyor in which the reciprocating parts rest by gravity on the stationary or supporting parts so that the reciprocatory parts may move upwardly to a limited extent with reference to the supporting parts, and return into correct relation to the supporting parts. A further object is to provide bearings of improved construction for supporting the reciprocatory part of the conveyor on the stationary parts thereof. Other objects and advantages of this invention will appear from the following description and claims.

In the accompanying drawings:

Fig. 1 is a perspective view, partly broken away, of a conveyor embodying this invention.

Fig. 2 is an enlarged transverse sectional elevation thereof, approximately on line 2—2, Fig. 1.

Fig. 3 is a fragmentary longitudinal elevation thereof, partly in section.

Fig. 4 is a fragmentary top plan view thereof, partly in section.

Fig. 5 is a fragmentary sectional elevation thereof, on line 5—5, Fig 4.

Fig. 6 is a sectional elevation thereof, on line 6—6, Fig. 4.

Fig. 7 is a fragmentary bottom plan view of the conveyor looking in the direction of the arrows 7—7 in Fig. 6.

Fig. 8 is a fragmentary sectional elevation similar to Fig. 5 but showing a conveyor of modified construction.

Fig. 9 is a fragmentary top plan view of the portion of the conveyor shown in Fig. 8.

It is very desirable that conveyors of this type be of light weight without sacrificing strength, for several reasons. In the first place, conveyors of this type are frequently used in mines where they must at frequent intervals be moved or advanced as the mining operations proceed. Because of the relatively low ceilings in most mines, derricks or other hoisting devices for moving or transporting the parts of the conveyor cannot be employed, and consequently, the parts of the conveyor must be moved and assembled manually. Furthermore, in a reciprocating or shaker type of conveyor inertia and momentum of the reciprocatory parts are important factors in determining the amount of power required to actuate the conveyor, so that a reduction in the weight of the reciprocatory parts results in a saving of the power required to operate the conveyor.

With these factors in mind, I have provided a conveyor of such construction that it can be made mainly of light weight metals or alloys having the required strength. Certain types of aluminum alloys have been found very desirable for this purpose, although other metals or alloys may be employed, if desired.

The reciprocatory portion of the conveyor includes a pair of beams 10 of any suitable cross section, I-beams being shown in the construction illustrated, but it will be obvious that these beams may be of any other desired cross sectional shape capable of carrying the weight of the material which is being conveyed and of transmitting reciprocatory or shaking motion, to the reciprocatory parts of the conveyor and to the material carried thereon. These beams are preferably made of a light weight metal or alloy. The beams are arranged parallel to each other and spaced apart to receive between them a trough carrying the material to be conveyed. These beams may be connected together by means of suitable couplings which will hereinafter be described. These beams are connected with suitable mechanism for imparting reciprocatory motion thereto in a direction lengthwise of the beams. Since such mechanisms are well known in the art, it is deemed unnecessary to show such mechanisms in the drawings.

The two parallel beams 10 are securely connected together at regularly spaced intervals by any suitable means which are so shaped as not to interfere with the mounting of a conveyor trough between the beams. In the construction shown by way of example, transverse or connecting members 11, which have upwardly turned portions 12 at opposite ends thereof which are so formed that they may readily be secured to the beams. When I-beams are employed, these end portions 12 extend vertically along the webs of the I-beams and may be suitably secured thereto by any desired means, such for example as bolts 14. The portions of the connecting members 11 intermediate of the ends thereof extend downwardly preferably below the lower edges of the beams and may be used in connection with the beams for supporting the trough.

The conveyor trough is formed of a plurality of sections or pans 15, those shown having substantially flat bottom portions 16 and upwardly extending side walls which terminate at their upper edges in flanges 17 which extend over the upper edges of the beams 10 and bear on the upper surfaces of the beams. These trough sections are preferably made of uniform lengths and are provided with parts that interfit with parts of the reciprocatory portion of the conveyor in such a manner that the trough sections need only be lowered into their operative positions. In the construction illustrated by way of example in Figs. 1 to 7, the ends of the sections rest upon and are secured to a connecting member 11 by means of interfitting parts, so that it is merely necessary to position the trough sections 15 upon the beams and connecting members 11, whereupon the trough sections will be held in place by gravity and if it is desired to remove a conveyor trough section, it is merely necessary to lift the same from its supports and replace it with another section which is lowered in place. The interfitting connections between the trough members 15 and the connecting members 11 may be of any suitable or desired type, and in the particular construction illustrated by way of example in Figs. 1 to 7, see particularly Figs. 6 and 7, each connecting member is provided with a depression or slot 20 which extends crosswise of the conveyor from opposite sides of the slot 20. The trough sections are provided at the opposite ends thereof with downwardly extending ribs or projections 24 which are formed so that the two projections 24 of adjacent trough sections may enter into the transverse slot 20 of the connecting member. The trough sections are also provided with longitudinally extending fins or projections 25 which join the projections 24 and extend into the longitudinally extending parts 21 and 22 of the slots in the connecting member 11. The downwardly extending projections or ribs 24 are of sufficient strength to transfer from the reciprocating beams and the connecting members 11 sufficient force to each conveyor section to provide for the reciprocation of these sections and the material carried thereon. The ribs or projections 24 in the construction shown are reinforced by the ribs 25, the ends of which are formed integral with the transverse ribs 24. When it is desired to remove any section from the conveyor, it is only necessary to lift the same so that the ribs or projections 24 and 25 will move out of the slots, whereupon the section is free to be removed from the conveyor and replaced by a similar section. The ribs 25 projecting into the longitudinal slots 21 serve to locate the sections in correct alignment with the other parts of the conveyor.

If desired, the forces for reciprocating the conveyor trough sections and the material thereon may be effected by means of interfitting parts on the beams themselves and the conveyor sections. For example, in the construction illustrated in Figs. 8 and 9, the beams may be provided at intervals with projecting parts 50 which may be secured to the upper surfaces of the beams or formed integral therewith and the troughs are provided at their edges with notches or recesses into which the blocks or projections 50 may fit so that longitudinal movement of the beams 10 will be transmitted to the trough sections 51 through the blocks or projections 50. These interfitting connections between the trough sections and the beams as shown in Figs. 8 and 9 may be used in place of the interfitting parts on the trough sections, and the connecting members 11, or the blocks or projections 50 cooperating with notches in the edges of the conveyor trough sections may be used in conjunction with the interlocking connections on the ends of the conveyor sections and the connecting members 11. In case only the interfitting connections shown in Figs. 8 and 9 are employed, the connecting members 11 would serve to support the ends of the trough sections and hold them in correct alignment.

The trough sections may, if desired, each be provided at one end thereof with a flange or lip 27 which extends over an adjacent section to form a substantially tight joint between the sections. This flange, however, may be omitted when coarser material is handled, since the ends of the sections will abut closely to each other end to end because of the cooperation of the ribs or projections 24 and 25 in the slots of the connecting members.

The beams 10 are made in lengths which can be manually lifted and handled, and the ends of these lengths of the beams may be secured together in any suitable or desired manner, and they are preferably so connected that they can be readily disconnected when it is desired to move the conveyor into a different location or to change the length of the same. In the construction shown for this purpose, a block 28 is bolted or otherwise rigidly secured to the web of each beam at each end thereof, preferably to the outer faces of the webs. In the construction shown, the blocks are permanently secured to the webs of the beams by means of bolts 29 and longitudinally extending bolts 30 are provided which pass through longitudinal holes in the blocks 28. Consequently, when these bolts are passed through the holes of adjacent blocks, and the nuts of the bolts 30 are tightened, adjacent lengths of the beams will be rigidly secured together and when it is necessary to disconnect a section of the beam, it is only necessary to release and remove the bolts 30. Any other means for removably securing the ends of the beams together may be employed, if desired.

The beams 10 of the conveyor are mounted to readily slide in the direction of their lengths when the conveyor is reciprocated to advance the material supported thereon, and in the construction illustrated, I have provided suitable supports or stands by means of which the conveyor may be supported on a surface. These supports or stands include pairs of upwardly extending legs or upright members 35 which may be of any suitable form. Pairs of these legs or supports are connected in any suitable or desired manner, for example, by means of transversely extending bolts or rods 36 so that the two upright members 35 and the rods 36 form a stand on which a portion of the conveyor is supported. Stands of other construction may be provided, if desired.

These stands are arranged at intervals lengthwise of the conveyor and suitable bearings are provided which are interposed between the beams 10 and the upper portions of the stands. In the construction shown for this purpose, I have provided on the upper surface of each of the legs of these stands, suitable grooves 37 extending lengthwise of the conveyor in which a series of anti-friction roller members, such as rollers or balls 38 are arranged. The grooves of the lower races terminate in end walls 39 which limit the extent to which the rolling members may roll on the lower race. These grooves 37 form the lower races for the balls or rollers. These balls or rollers, as clearly shown in Fig. 5, project above the grooves so that the lower faces of the beams may rest directly on the balls or rollers, or if desired, the upper races 40 may be bolted or otherwise secured to the lower surfaces of the beams. When such upper races or guides are employed, they are provided with grooves 41 on the undersurfaces thereof which also cooperate with the balls or rollers 38, see particularly Figs. 2, 3 and 5. The grooves in the upper and lower races may be of any desired cross sectional shape, grooves of semi-circular cross section being preferred when balls are used. The grooves of the upper race preferably also have rigid end walls 42 which limit the extent to which the balls or rollers may roll in the grooves. Consequently, during the reciprocation of the beams, the balls or rollers will roll in the grooves 37 and 41, and thus materially reduce the friction between the beams and the stands on which they are supported. This construction also has the advantage that the lower grooves 37 act as troughs to contain oil or other lubricant.

It is not necessary to use the upper races 40 as described, since it is possible to have the beams 10 bear directly upon the rolling bearings 38, as clearly shown in Fig. 8, in which the lower races are identical with those described in connection with Figs. 1 to 7, and the lower faces of the beams 10 rest directly on the rolling bearings 38, such as balls or rollers.

In the use of conveyors of this type, these conveyors are frequently provided at one end thereof with scoops or "duck bills" (not shown), which may be pushed under or into the material which is to be conveyed, and consequently, sometimes considerable pressure must be transmitted to these scoops or duck bills by the beams 10 in order to have the scoops pass under or into the material which is to be transported by the conveyor. When this relatively heavy pressure is applied to the longitudinal series of beams 10, they sometimes tend to buckle or lift slightly, particularly when the conveyor is supported on a surface which is not absolutely level. When this buckling or lifting takes place, portions of the series of beams may lift up out of engagement with the stands. In some types of constructions heretofore used, means have been provided for preventing the lifting of the beams from the stands, but I have found that better results can be obtained and less damage or wear will result to the conveyor, if the lifting of the beams is unopposed. I, consequently, provide guide means to ensure that the beams will again return into proper positions so that the upper race will again move into correct relation to the rollers or balls which remain in the lower race. For this purpose, I have provided on the outer face of each stand, an upwardly extending flange 45 which may be formed integral with the outer portions of the legs 35 of the stands, see particularly Figs. 2, 3 and 4. If the conveyor beams rise due to temporary buckling, they will be confined against excessive lateral movement by having the beams engage the upwardly extending flanges 45. Consequently, when the beam drops back into place, the upper race will move into correct operative relation to the balls or rollers so that the operation of the conveyor may be continued without interruption.

The bearings described also have the further advantage that if it is desired to move the conveyor into another position, the beams 10 need only be lifted from the stands, and when the conveyor is again assembled in another position, the beams are merely placed on the stands in such manner that the upper races 41 of the beams, or the beams themselves, if the construction shown in Fig. 8 is employed, will be in correct relation to the lower races formed on the stands. The bearing construction described, therefore, is not only desirable for the reason that it permits the beams of the conveyor to rise in case heavy pressures are placed on the same and to again locate themselves relatively to the bearing, but also that it facilitates the assembly and dismantling of the conveyor, as well as the cleaning and re-lubricating of the bearings.

The conveyor constructions described have the advantage that nearly all of the parts thereof may be made of lightweight metal, so that the same can be readily transported, and that its length can be easily changed. The forces required for reciprocating the parts and the material carried thereby are transmitted through the beams or the connecting members 11, or both, directly to the individual trough sections. In conveyors of this type now commonly used, these forces are transmitted only to the conveyor sections, so that the sections must be of strong and heavy construction, so that each section is able to transmit these forces to the entire string of sections throughout the length of the conveyor. In the constructions described, each section receives only enough force to produce reciprocation of that section and the load carried thereby. Consequently, the individual sections can be made of light weight, so as to be easily handled.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A shaker conveyor comprising a trough and a reciprocatory power transmitting structure including two parallel series of beams extending throughout the length of the conveyor, each series having the beams connected end to end, a plurality of connecting members extending crosswise of said beams and secured to said beams for supporting said beams in laterally spaced relation to each other, said connecting members being spaced from each other lengthwise of said beams at fixed intervals and having intermediate portions extending downwardly below said beams, said trough comprising a plurality of trough sections arranged end to end for carrying the material to be conveyed and having their ends resting on and releasably secured to said connecting members and their edges resting on the upper surfaces of said beams, and connections between each of said trough sections and said reciprocatory power transmitting structure for transmitting reciprocatory motion from said beams individually to each trough section, each of said trough sections receiving reciprocatory motion solely from said beams.

2. A shaker conveyor according to claim 1, characterized in that said trough sections have side edges extending outwardly over and resting upon the upper surfaces of said beams, and having their ends resting on said connecting members and provided with projections on their lower faces which interlock with recesses in said connecting members for transmitting reciprocatory motion of said beams through said cross members to said trough sections.

3. A shaker conveyor according to claim 1, characterized in that said connecting members have slots formed therein extending transversely of said conveyor and other slots extending longitudinally of said conveyor from opposite sides of and intersecting said transversely extending slots, said trough sections having at each end thereof a downwardly extending projection which is formed to occupy not more than one-half of the transversely extending slot of a connecting member and a longitudinally extending projection formed integral with said transversely extending projection and formed to extend into one of said other slots.

4. A shaker conveyor according to claim 1, characterized in that said trough sections have side edges extending outwardly over and resting upon the upper surfaces of said beams, and interfitting parts on said beams and said side edges of said trough sections for transmitting reciprocatory motion of said beams directly to each of said trough sections.

5. A shaker conveyor according to claim 1, characterized in that said trough sections have side edges extending outwardly over and resting upon the upper surfaces of said beams and having their ends resting on said connecting members, and interfitting parts on said beams and said side edges of said trough sections for transmitting reciprocatory motion of said beams directly to each of said trough sections.

6. A shaker conveyor including stationary supporting members having bearings on the upper portions thereof, a reciprocatory power transmitting structure comprising two parallel beams extending throughout the length of the conveyor and spaced apart laterally, said beams each comprising a plurality of sections secured together end to end, connecting members extending crosswise of said conveyor and arranged at spaced intervals lengthwise of said conveyor and rigidly secured to said beams for holding said beams in operative and spaced relation to each other, and a trough for the material to be conveyed and formed of a plurality of sections arranged end to end lengthwise of said conveyor, and interfitting power transmitting parts on said sections and on said reciprocatory structure which interlock when said sections are laid in their operative positions on said reciprocatory structure, to enable said reciprocatory structure to transmit forces directly and individually to each trough section, all of said trough sections receiving their reciprocatory motion solely from said reciprocatory structure.

7. A shaker conveyor including two parallel power transmitting beams extending throughout the length of said conveyor and spaced apart, said beams each comprising a plurality of sections secured together end to end, supporting structure having bearings on which said beams are arranged for reciprocal motion, connecting members extending crosswise of said conveyor and arranged at spaced intervals lengthwise of said conveyor and rigidly secured to said beams for holding said beams in operative and spaced relation to each other, a trough comprising a plurality of sections arranged end to end and having their upper edge portions resting on said beams and extending lengthwise between adjacent connecting members, and interlocking connections between said connecting members and the ends of said trough sections for removably securing said trough sections in fixed relation to said beams and said connecting members, said interlocking connections constituting the sole means for transmitting reciprocatory motion to said trough sections.

8. A shaker conveyor according to claim 7, in which said connecting members are provided with slots and the trough sections have downwardly extending projections which enter said slots to position said sections in fixed relation to said beams and which transmit reciprocatory motion from the beams to said sections.

9. A shaker conveyor according to claim 7, in which said connecting members are provided with slots extending transversely of said conveyor, and longitudinally extending slots extending in opposite directions from said transversely extending slots, and downwardly extending projections on said conveyor sections which enter said transverse and longitudinal slots to hold said sections against longitudinal and transverse movement relatively to said beams.

ERNEST H. HOLZWORTH.

REFERENCES CITED

The following references are of record in the file of this patent:

UNITED STATES PATENTS

| Number | Name | Date |
|---|---|---|
| 1,770,979 | Gerdetz | July 22, 1930 |
| 1,917,923 | Clarke | July 11, 1933 |
| 1,922,198 | Crawford | Aug. 15, 1933 |
| 1,956,791 | Clarke | May 1, 1934 |
| 1,978,648 | Rich | Oct. 30, 1934 |
| 2,141,439 | Jarrett | Dec. 27, 1938 |

FOREIGN PATENTS

| Number | Country | Date |
|---|---|---|
| 269,751 | Great Britain | Apr. 28, 1927 |
| 459,466 | Great Britain | Jan. 8, 1937 |
| 609,531 | Germany | Feb. 20, 1935 |